United States Patent [19]

Henderson

[11] 4,280,358

[45] Jul. 28, 1981

[54] MONITORING THE OPERATION OF AN INTERNAL COMBUSTION ENGINE

[75] Inventor: Henning M. Henderson, Springs, South Africa

[73] Assignee: Kiloking (Proprietary) Limited, South Africa

[21] Appl. No.: 86,569

[22] Filed: Oct. 19, 1979

[30] Foreign Application Priority Data

Oct. 19, 1978 [ZA] South Africa .................... 78/5898

[51] Int. Cl.³ .......................................... G01L 23/24
[52] U.S. Cl. .................................... 73/115; 73/117.3; 340/52 R
[58] Field of Search .............. 73/115, 116, 114, 117.3; 340/52 R

[56] References Cited

U.S. PATENT DOCUMENTS

| 2,738,404 | 3/1956 | Fitzsimmons | 201/48 |
|---|---|---|---|
| 2,870,753 | 1/1959 | Shuck et al. | 123/25 |
| 3,014,366 | 12/1961 | Faunce | 73/114 |
| 3,347,092 | 10/1967 | Stutson | 73/114 |
| 3,812,710 | 5/1974 | Bauman et al. | 73/114 |
| 3,922,909 | 12/1975 | Dixson et al. | 73/115 |
| 3,925,753 | 12/1975 | Auman et al. | 340/52 R |
| 3,937,202 | 2/1976 | Heath | 123/198 R |
| 4,054,781 | 10/1977 | Kuno et al. | 364/442 |
| 4,065,961 | 1/1978 | Crew | 73/117.3 |
| 4,067,232 | 1/1978 | Murray | 73/115 |

FOREIGN PATENT DOCUMENTS

| 114535 | 1/1942 | Australia . |
| 1083459 | 11/1955 | France . |
| 2066313 | 8/1971 | France . |
| 2369117 | 5/1978 | France . |

Primary Examiner—Jerry W. Myracle
Attorney, Agent, or Firm—Karl W. Flocks

[57] ABSTRACT

A monitoring device for monitoring the operation of a vehicle internal combustion engine having inlet ducting for admitting a fuel/air mixture into the engine comprises vacuum sensitive apparatus for sensing the degree of vacuum in the inlet ducting, speed sensitive apparatus for sensing the rotational speed of the engine, and warning apparatus including gates, multivibrator circuitry, a loudspeaker, and a recorder. When the degree of vacuum falls below a predetermined vacuum value, warning bleeps are issued by the loudspeaker and recordings are made on the recorder. The warning apparatus is operative in response to the vacuum sensitive apparatus and the speed sensitive apparatus to provide a predetermined vacuum value which is a stepwise increasing function of rotational speed sensed.

An inclined mercury containing capsule is provided to inhibit bleeping and recording when the vehicle is inclined at more than a predetermined angle to the horizontal in the direction of travel of the vehicle.

9 Claims, 3 Drawing Figures

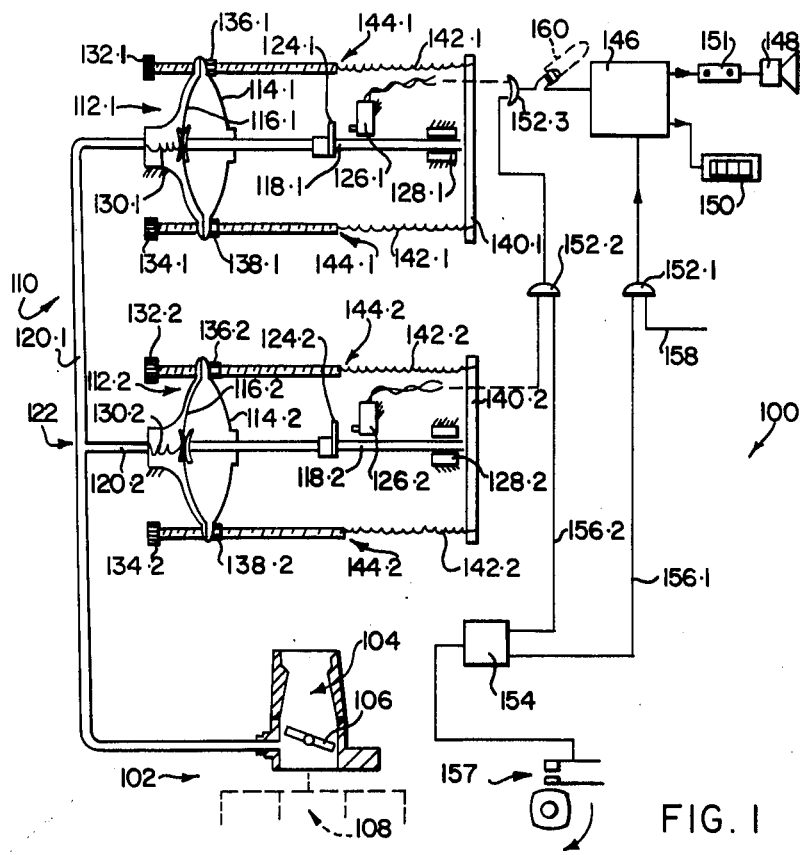
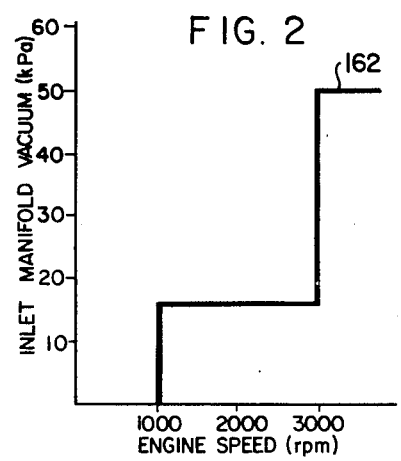
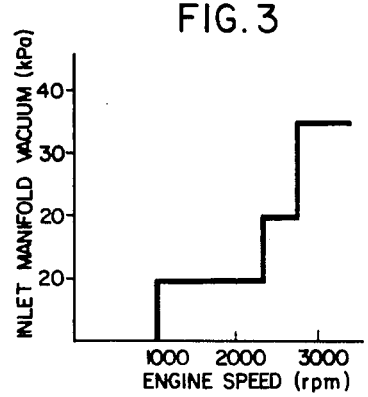

MONITORING THE OPERATION OF AN INTERNAL COMBUSTION ENGINE

BACKGROUND OF THE INVENTION

This invention relates to monitoring the operation of an internal combustion engine. More particularly, it relates to a method of monitoring the operation of such an engine and to a monitoring device for use in such method.

The invention finds particular application in the monitoring of a vehicle engine during driving, for purposes of promoting driving habits which result in economic utilization of fuel, and providing vehicle fleet operators with a management tool for use in monitoring the driving habits of drivers.

Applicant is aware of a warning device for use in a vehicle having an internal combustion engine, which device comprises a diaphragm type actuator arranged to actuate an electrical switch. The switch is connected in series with an electrical warning light to a source of electric current, and the diaphragm type actuator is connected to the inlet manifold of the engine. The operation of the device is such that, when the degree of vacuum in the inlet manifold falls below a predetermined value, the switch is closed, causing the warning light to be actuated. This will then be an indication to the driver of the vehicle that the engine operating conditions are such as to lead to uneconomic utilization of fuel.

Applicant is also aware of a device for use in a vehicle having an internal combustion engine, which device comprises a diaphragm type actuator and a mechanically operated counting device arranged to be acted upon mechanically by the diaphragm type actuator when the degree of vacuum in the engine's inlet manifold falls to below a predetermined value, to record a count on the counter.

Applicant has found that when the devices referred to above are adjusted to provide a warning signal or a recording when the degree of vacuum falls to a value at which there is uneconomic utilization of fuel, at low engine speeds, then the driver is able, by gradually increasing the speed of the vehicle, to obtain a relatively high speed without a warning signal being issued or a recording being made. At such high speeds there is again uneconomic utilization of fuel. However, if the devices are adjusted to provide a warning signal or a recording when there is uneconomic utilization of fuel at high engine speeds, then the devices become so sensitive at low engine speeds that the slightest acceleration results in a warning signal being issued or a recording being made. This is frustrating to the driver and inhibits smooth traffic flow.

Another disadvantage of the device described above having a mechanical counter is that it provides a single count whenever the degree of vacuum falls below the predetermined value, regardless of the length of time for which the degree of vacuum remains below that value. The reading on the counter will therefore be of little value to a fleet operator, as the driver can keep the reading on the counter at a low value by driving in such a manner that the degree of vacuum in the inlet manifold remains at low, uneconomical levels for long stretches of time.

SUMMARY OF THE INVENTION

It is an object of the present invention to overcome or at least mitigate the above disadvantages.

According to the invention there is provided a method of monitoring the operation of an internal combustion engine having inlet ducting for admitting air or a fuel/air mixture into the engine, which method comprises:

sensing the degree of vacuum in the inlet ducting;

sensing the rotational speed of the engine; and issuing a warning signal and/or making a recording when the degree of vacuum falls below a predetermined vacuum value, which predetermined vacuum value is an increasing function of the rotational speed sensed.

The predetermined vacuum value may be a stepwise increasing function increasing in two or more steps as the rotational speed increases.

Said warning may be issued and/or said recording be made only when the rotational speed sensed is greater than a predetermined speed value. Thus, for engine rotational speeds from standstill to said predetermined speed value no warning signal is issued nor a recording made, regardless of the degree of vacuum in the inlet manifold. Accordingly, when the engine is at standstill and the interior of the inlet manifold is at atmospheric pressure (in other words, the degree of vacuum is zero), no warning signal is issued nor a recording made.

Where, when the degree of vacuum sensed falls below the predetermined vacuum value, a recording is made, the recording may be such as to be indicative of the length of time for which the degree of vacuum sensed remains below the predetermined vacuum level.

Where the method is applied to an internal combustion engine having a carburettor in said inlet ducting for providing a fuel/air mixture to the engine, and a butterfly valve for regulating the rate of flow of said mixture to the engine, the degree of vacuum may be sensed at a point downstream of the butterfly valve.

Further according to the invention there is provided a monitoring device for use in monitoring the operation of an internal combustion engine having inlet ducting for admitting air or a fuel/air mixture into the engine, which monitoring device comprises:

vacuum sensitive means for sensing the degree of vacuum in the inlet ducting;

speed sensitive means for sensing the rotational speed of the engine; and warning means and/or a recorder which is operative in response to the vacuum sensitive means and the speed sensitive means to issue a warning signal and/or make a recording when the vacuum sensed by the vacuum sensitive means falls below a predetermined vacuum value, which predetermined vacuum value is an increasing function of the rotational speed sensed.

The vacuum sensitive means may comprise an electropneumatic transducer for providing an electrical signal indicative of the degree of vacuum in the inlet ducting. Thus, for example, the vacuum sensitive means may be in the form of two or more diaphragm type actuators each associated with an electrical switch and each being adapted to actuate its associated switch at different vacuum levels. Alternatively, the vacuum sensitive means may comprise a single diaphragm type actuator and two or more electrical switches associated therewith, each being adapted to be actuated by the actuator at a different vacuum level. Further alternatively the vacuum sensitive means may, for example, be in the form of any suitable transducer which is operative to produce an electrical quantity such as current or voltage which varies with the vacuum sensed.

The predetermined vacuum value may increases stepwise in two or more steps as the rotational speed increases.

The warning means and/or the recorder may be arranged to be operative in response to the vacuum sensitive means and the speed sensitive means to give a warning signal and/or make a recording only when the rotational speed sensed is greater than a predetermined speed value.

The recorder may be adapted and arranged to make a recording which is indicative of the length of time for which the degree of vacuum remains below the predetermined vacuum level.

Still further to the invention there is provided, in a motor vehicle including an internal combustion engine having inlet ducting for admitting air or a fuel/air mixture into the engine, vacuum sensitive means arranged to sense the degree of vacuum in the inlet ducting, speed sensitive means arranged to sense the rotational speed of the engine, and warning means and/or a recorder which is operative in response to the vacuum sensitive means and the speed sensitive means to issue a warning signal and/or make a recording when the vacuum sensed by the vacuum sensitive means falls below a predetermined vacuum value, which predetermined vacuum value is an increasing function of the rotational speed sensed.

The invention will now be described in more detail, by way of example, with reference to the accompanying drawings.

BRIEF DESCRIPTION OF THE DRAWINGS

In the drawings

FIG. 1 is a schematic diagram of a monitoring device in accordance with the invention, installed in a motor vehicle;

FIG. 2 is a graph illustrating the operation of the device of FIG. 1; and

FIG. 3 is a graph illustrating the operation of an alternative embodiment of the invention wherein the predetermined vacuum value at which warning signals are issued and a recording is made is a stepwise increasing function of engine rotational speed, increasing in three steps, instead of in two steps as is the case with the device of FIG. 1.

DETAILED DESCRIPTION OF THE DRAWINGS

Referring now to FIG. 1, reference numeral 100 generally indicates a monitoring device which is connected to inlet ducting 102 for admitting a fuel/air mixture into the internal combustion engine of a motor vehicle.

The inlet ducting comprises a barrel 104 of the vehicle's carburettor, the carburettor having a butterfly valve 106 for regulating the rate of flow of the fuel/air mixture into the engine. The inlet ducting 102 further comprises an inlet manifold 108 (shown in dotted lines) leading to the various cylinders of the engine.

The monitoring device 100 comprises vacuum sensitive means 110 in the form of two diaphragm devices 112.1 and 112.2 secured to a common mounting bracket (not shown). The two diaphragm devices are similar in construction and, although only the diaphragm device 112.1 will be described below, the description will apply equally to the diaphragm device 112.2, the parts of the diaphragm device 112.2 in the drawing being indicated by the same reference numerals as those of the diaphragm device 112.1, except that they are followed by a suffix 2 instead of a suffix 1.

The diaphragm device 112.1 has a diaphragm housing 114.1 mounted on the mounting bracket, a diaphragm 116.1, and a rod 118.1 connected to the diaphragm 116.1 and protruding from the housing 114.1.

The diaphragm housing 114.1 is connected to the interior of the carburettor barrel 104 at a point downstream of the butterfly valve 106 by means of a tube 120.1. The tubes 120.1 and 120.2 of the diaphragm devices 112.1 and 112.2 are interconnected by means of a T-connection 122.

On the rod 118.1 there is provided an actuating collar 124.1. There is further provided a micro-switch 126.1 which is arranged to be actuated by the actuating collar 124.1. The micro-switch 126.1 is mounted in such a manner on the mounting bracket that it is slidably adjustable in a direction parallel to the longitudinal direction of the rod 118.1. Alternatively, or in addition, the actuating collar 124.1 may be adjustably mounted on the rod 118.1 so as to permit adjustment of the longitudinal position of the actuating collar on the rod 118.1. The free end of the rod 118.1 is guided in a guide 128.1 which is fixed in relation to the mounting bracket.

Within the diaphragm housing 114.1, to the left hand side of the diaphragm 116.1 (as viewed in the drawing) there is provided a compression spring 130.1 which urges the diaphragm to the right hand side of the diaphragm housing. Accordingly, the spring 130.1 acts in opposition to the effect of vacuum in the diaphragm housing 114.1 to the left hand side of the diaphragm 116.1.

To provide for adjustment of the vacuum level in the inlet ducting 102 at which the micro-switch 126.1 is actuated, the device 112.1 is provided with two adjustment screws 132.1 and 134.1 which engage respectively with two screw-threaded nuts 136.1 and 138.1 fixed to the diaphragm housing 114.1. The screw-threaded parts of the screws 132.1 and 134.1 project in the same direction as that in which the rod 118.1 projects from the diaphragm housing 114.1. Between the screw threaded end of each of the screws 132.1 and 134.1 and a yoke 140.1 which is fast with the end of the rod 118.1, there extends a coil spring 142.1. Each coil spring 141.1 is connected to the end of the respective screw by means of a swivel connection 144.1.

The monitoring device 100 further comprises electrical circuitry 146. A loudspeaker 148 and an electromechanical counter 150 are connected to the electrical circuitry 146. The loudspeaker 148 is connected electrically to the circuitry 146 via a removable link 151.

The monitoring device 100 further comprises a first gating device 152.1, a second gating device 152.2, and a third gating device 152.3. It also further comprises speed sensitive means 154 having two outputs, namely a first output 156.1 and a second output 156.2. The speed sensitive means is connected to the contact breaker points 157 of the engine's distributor in the case of a spark ignition engine. The operation of the speed sensitive means 154 is such that, when the engine speed is above a first predetermined speed, then an output signal will appear on the first output 156.1, whereas, when the engine speed is higher and a second, higher predetermined speed, then an output signal will also appear on the second output 156.2. Such speed sensitive means per se are known in the art and any suitable version providing output signals on two outputs at different speeds may be utilised.

The first predetermined speed may be about 1000 rpm and the second predetermined speed may be about 3000 rpm. These predetermined speeds may be adjustable.

The output 156.1 is connected to one of the inputs of the gating device 152.1 which has an AND function and the output 156.2 is connected to one of the inputs of the gating device 152.2 which also has an AND function. The micro-switch 126.1 is connected to one of the inputs of the gating device 152.3 which has an OR function and the micro-switch 126.2 is connected to the other input of the gating device 152.2. The output of the gating device 152.2 is connected to the other input of the gating device 152.3 and the output of the gating device 152.3 is connected to the electrical circuitry 146. The other input of the gating device 152.1 is connected to a power supply lead 158 for the circuitry 146.

The operation of the monitoring device 100 is as follows. The adjustment screws 132.1 and 134.1 are adjusted so that the micro-switch 126.1 will be actuated at a low degree of vacuum in the inlet ducting 102, say, for example, about 15 kPa (vacuum). The adjustment screws 132.2 and 134.2 are adjusted such that the micro-switch 126.2 will be actuated at a higher degree of vacuum in the inlet ducting, say, for example, 40 to 50 kPa (vacuum).

Under good engine operating conditions, the degree of vacuum in the inlet ducting 102 will be high, typically about 70 kPa (vacuum), resulting in good utilisation of fuel drawn into the engine via the inlet ducting. Also, the engine will normally be rotating at a speed which is above the first predetermined speed so that an output signal will appear on the output 156.1, thus enabling the gate 152.1 and allowing electrical power to be fed from the power supply lead 158 to the electrical circuitry 146. If the speed of the engine is above the second predetermined speed of, say, about 3000 rpm, then the second gate 152.2 will also be enabled.

When the accelerator pedal of the vehicle is pressed down, causing the butterfly valve 106 to open further, the degree of vacuum in the inlet ducting 102 drops, particularly if the pedal is depressed at an excessive rate or when the engine is running at a low rotational speed, leading to uneconomic utilization of fuel. The low degree of vacuum will cause the diaphragm 116.1 and the rod 118.1 to move to the right hand side as viewed in the drawing and the micro-switch 126.1 to be actuated. The construction of the electrical circuitry 146 is such that when the micro-switch 126.1 is actuated an audible signal in the form of intermittent bleeping will issue from the loudspeaker 148 and also, if the micro-switch 126.1 continues to be actuated for more tha, say, about two bleeps, then a unit count will be recorded by the counter 150 for each subsequent bleep. The construction of circuitry operating as described will be within the capabilities of a man skilled in the art and will therefore not be described in detail. The intermittent bleeping may, for example, be provided by a free-running multivibrator which is energised when the microswitch 126.1 is actuated. Th counter may be driven by the same free-running multivibrator via a pair of suitably arranged bistable multivibrators inhibiting operation of the counter for the first two oscillations of the free-running multivibrator.

If the driver eases off on the accelerator pedal, or if he changes to a lower gear which will lead to a higher engine speed for the same road speed, then the degree of vacuum in the inlet 102 will rise, causing the diaphragm 116.1 and the rod 118.1 to move again to the left hand side as viewed in the drawing. This will cause the actuating collar 124.1 to disengage from the micro-switch 126.1, causing the switch's contacts to open. This in turn will inhibit further bleeping and counting by the loudspeaker 148 and the counter 150. Provided the engine speed is less than 3000 rpm, actuation of the micro-switch 126.2 will not have any effect, as the gate 152.2 will then be disabled.

At engine speeds above the second predetermined speed of 3000 rpm, an output signal will also appear on the output 156.2, enabling the second gate 152.2. As has been mentioned above, the second diaphragm device 112.2 has been adjusted so that the micro-switch 126.2 will be actuated at a vacuum level which is higher than that at which the microswitch 126.1 of the first diaphragm device 112.1 will be actuated. Accordingly, if the engine runs above the second predetermined speed, then the monitoring device 100 will be more sensitive to drops in the vacuum level in the inlet ducting 102 and will cause bleeping and counting via the micro-switch 126.2 of the second diaphragm device 112.2, the gate 152.2 and the gate 152.3. Thus, the driver of the vehicle will have to be much more careful with his accelerator pedal when driving at high speed than will be necessary when he is driving at low speed.

If the vehicle engine stalls for example, then the output signals will disappear from both the outputs 156.2 and 156.1. This will disable the gate 152.1, removing the electrical supply from the electrical circuitry 146, and consequently prevent the issuance of bleeps from the loudspeaker 148 and the making of recordings by the recorder 150. In an alternative arrangement the speed sensitive means 154 may be arranged via its output 156.1 to inhibit the micro-switch 126.1 from actuating the electrical circuitry 146, by means of a gating circuit arranged in a similar manner as the gating circuit 152.2.

In an alternative arrangement the two micro-switches 126.1 and 126.2 may be mounted on the same diaphragm device, to be actuated at different vacuum levels. This will eliminate the need for two separate diaphragm devices but will require a diaphragm device which is more sophisticated.

The operation of the device of FIG. 1 is graphically illustrated in the graph of FIG. 2, being a representation of the degree of vacuum as a function of engine rotational speed below which warning signals are issued by the loudspeaker 148 and recordings made by the recorder 150.

In FIG. 3 there is shown a graph, similar to the graph of FIG. 2, illustrating the operation of a three-stage device. In this device no warning signals or recordings are provided at engine speeds below 1000 rpm, regardless of the degree of vacuum in the inlet manifold. At speeds between 1000 rpm and 2300 rpm warning signals or recordings are provided at vacuum levels of less than 10 kPa, at speeds between 2300 rpm and 2750 rpm at vacuum levels of less than 20 kPa, and at speeds over 2750 rpm at vacuum levels of less than 35 kPa.

If desired, an inclined mercury containing capsule 160 (shown in dotted lines) having a pair of electrodes may be connected in the output of the OR gate 152.3. The capsule may be arranged such that when the vehicle is inclined at more than a predetermined (adjustable)

angle to the horizontal in the direction of travel of the vehicle, then electrical contact between the electrodes of the capsule is broken. This will allow the driver to depress the accelerator pedal hard when, for example, travelling up a ramp or other steep incline, without being penalised by the recording of counts on the recorder 150.

The loudspeaker 148 may be silenced by removing the link 151. This may be useful when, for example, it is desired to select drivers for their economic driving ability before employing them. Thus, when a driver solicits for employment he is given a vehicle and asked to take it for a test drive along a preselected route. The count on the counter after completion of the test drive is then evaluated and only those drivers who return a low count are employed.

The vacuum level at which the switch 126.6 is actuated (i.e. the level indicated at 162 in the graph of FIG. 2) may be chosen such that when the vehicle is travelling steadily at a predetermined high speed such as, for example, 90 kph, then the degree of vacuum in the inlet manifold is just above the line 162. When attempting to increase the speed of the vehicle beyond the predetermined high speed, even when this takes place very gradually, the degree of vacuum will fall below the line 162 and the device will commence penalising the driver by issuing warning signals and making recordings. The device is thus operative at low speeds to inhibit rapid acceleration of the vehicle whereas, at high speed it is operative to inhibit speeds in excess of a predetermined high speed.

What is claimed is:

1. A method of monitoring the operation of an internal combustion engine having inlet ducting for admitting air or a fuel/air mixture into the engine, which method comprises
    sensing the degree of vacuum in the inlet ducting and providing a vacuum signal when said vacuum falls below a predetermined vacuum level;
    sensing the rotational speed of the engine and providing a first speed signal when said rotational speed exceeds a first predetermined speed value and a second speed signal when said rotational speed exceeds a second predetermined speed value greater than the first predetermined speed value;
    gating the vacuum signal and the second speed signal to provide an enabling signal when either said vacuum signal or said second speed signal, or both said vacuum signal and said second speed signal are present; and
    issuing a warning signal and/or making a recording under operational conditions of the engine in which both the first speed signal and the enabling signal are present.

2. A method as claimed in claim 1, wherein the vacuum signal is a first vacuum signal, and wherein the predetermined vacuum value is a first predetermined vacuum value; which method further comprises providing a second vacuum signal when said vacuum falls below a second predetermined vacuum value greater than the first predetermined vacuum value, said gating including gating the second vacuum signal so as to provide said enabling signal when said first vacuum signal and/or both said second vacuum signal and said second speed signal are present.

3. A method as claimed in claim 1, wherein the recording is such as to be indicative of the length of time for which the engine operates under said operational conditions.

4. A method as claimed in claim 1, as applied to an internal combustion engine having a carburetor in said inlet ducting for providing a fuel/air mixture to the engine, and a butterfly valve for regulating the rate of flow of said mixture to the engine, the degree of vacuum being sensed downstream of the butterfly valve.

5. A monitoring device for use in monitoring the operation of an internal combustion engine having inlet ducting for admitting air or a fuel/air mixture into the engine, which monitoring device comprises
    vacuum sensitive means for sensing the degree of vacuum in the inlet ducting and being operative to provide a vacuum signal when said vacuum falls below a predetermined vacuum value;
    speed sensitive means for sensing the rotational speed of the engine and being operative to provide a first speed signal when said rotational speed exceeds a first predetermined speed value and a second speed signal when said rotational speed exceeds a second predetermined speed value greater than the first predetermined speed value;
    gating means which is operative in response to the speed sensitive means and the vacuum sensitive means to provide an enabling signal when either said vacuum signal or said second speed signal, or both said vacuum signal and said second speed signal are present; and
    warning means and/or a recorder which is operative in response to the first speed signal and the enabling signal to issue a warning signal and/or make a recording under operational conditions of the engine in which both the first speed signal and the enabling signal are present.

6. Apparatus as claimed in claim 5, wherein the vacuum sensitive means comprises an electro-pneumatic transducer for providing said vacuum signal as an electrical signal.

7. Apparatus as claimed in claim 5, wherein the vacuum signal is a first vacuum signal, wherein the predetermined vacuum value is a first predetermined vaccum value, wherein the vacuum sensitive means is further operative to provide a second vacuum signal when said vacuum falls below a second predetermined vacuum value greater than the first predetermined vacuum value, and wherein the gating means is first gating means;
    which apparatus further comprises second gating means, the first gating means being operative in response to the speed sensitive means and the vacuum sensitive means via the second gating means to provide said enabling signal when said first vacuum signal and/or both said second vacuum signal and said second speed signal are present.

8. Apparatus as claimed in claim 5, wherein the recorder is adapted and arranged to make a recording which is indicative of the length of time for which the engine operates under said operational conditions.

9. In a motor vehicle including an internal combustion engine having inlet ducting for admitting air or a fuel/air mixture into the engine, vacuum sensitive means arranged to sense the degree of vacuum in the inlet ducting and being operative to provide a vacuum signal when said vacuum falls below a predetermined vacuum value, speed sensitive means arranged to sense the rotational speed of the engine and being operative to provide a first speed signal when said rotational speed exceeds a first predetermined speed value and a second speed signal when said rotational speed exceeds a second predetermined speed value greater than the first predetermined speed value, gating means which is operative in response to the speed sensitive means and the vacuum sensitive means to provide an enabling signal when either said vacuum signal or said second speed signal, or both said vacuum signal and said second speed signal are present; and warning means and/or a recorder which is operative in response to the first speed signal and the enabling signal to issue a warning signal and/or make a recording under operational conditions of the engine in which both the first speed signal and the enabling signal are present.

* * * * *